G. W. DENNIS.
MACHINE FOR MOLDING METAL IN INDETERMINATE LENGTHS.
APPLICATION FILED FEB. 2, 1911.
1,077,458.
Patented Nov. 4, 1913.
3 SHEETS—SHEET 1.
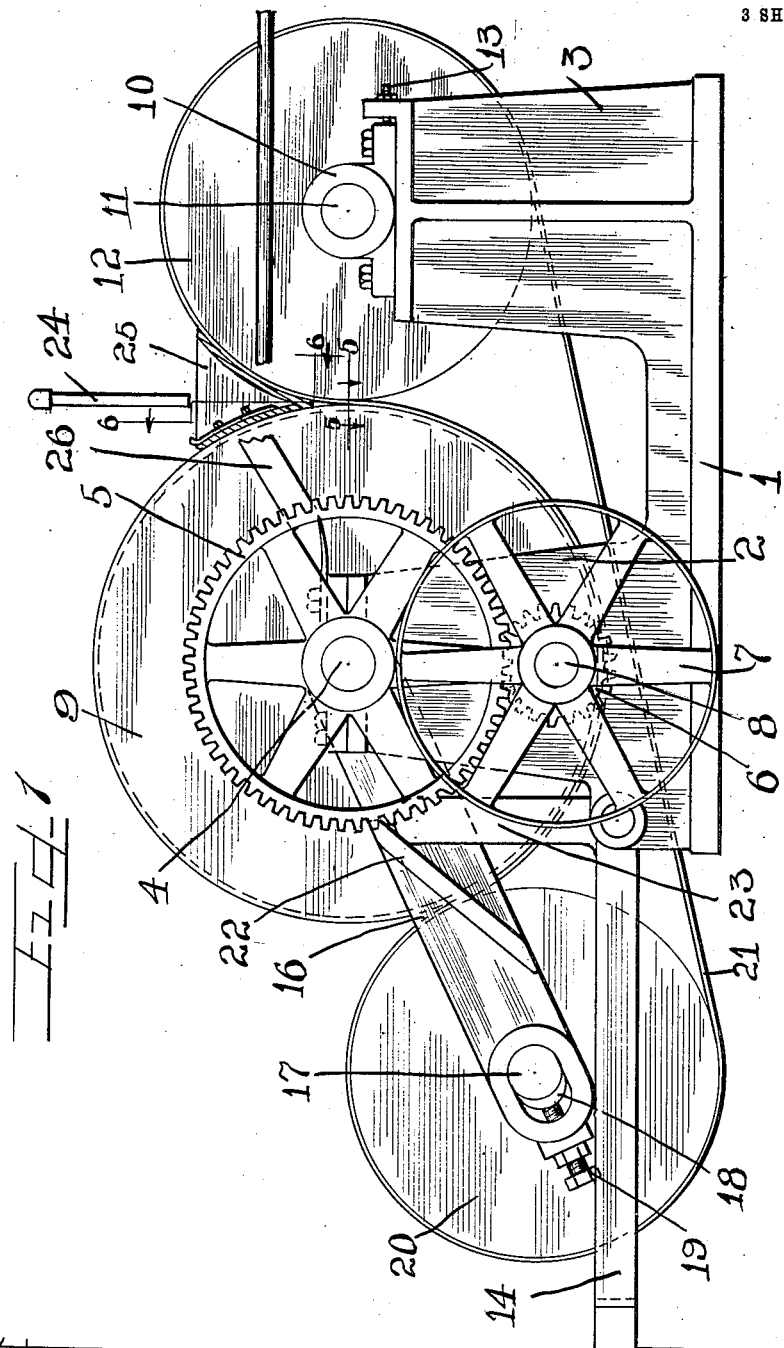

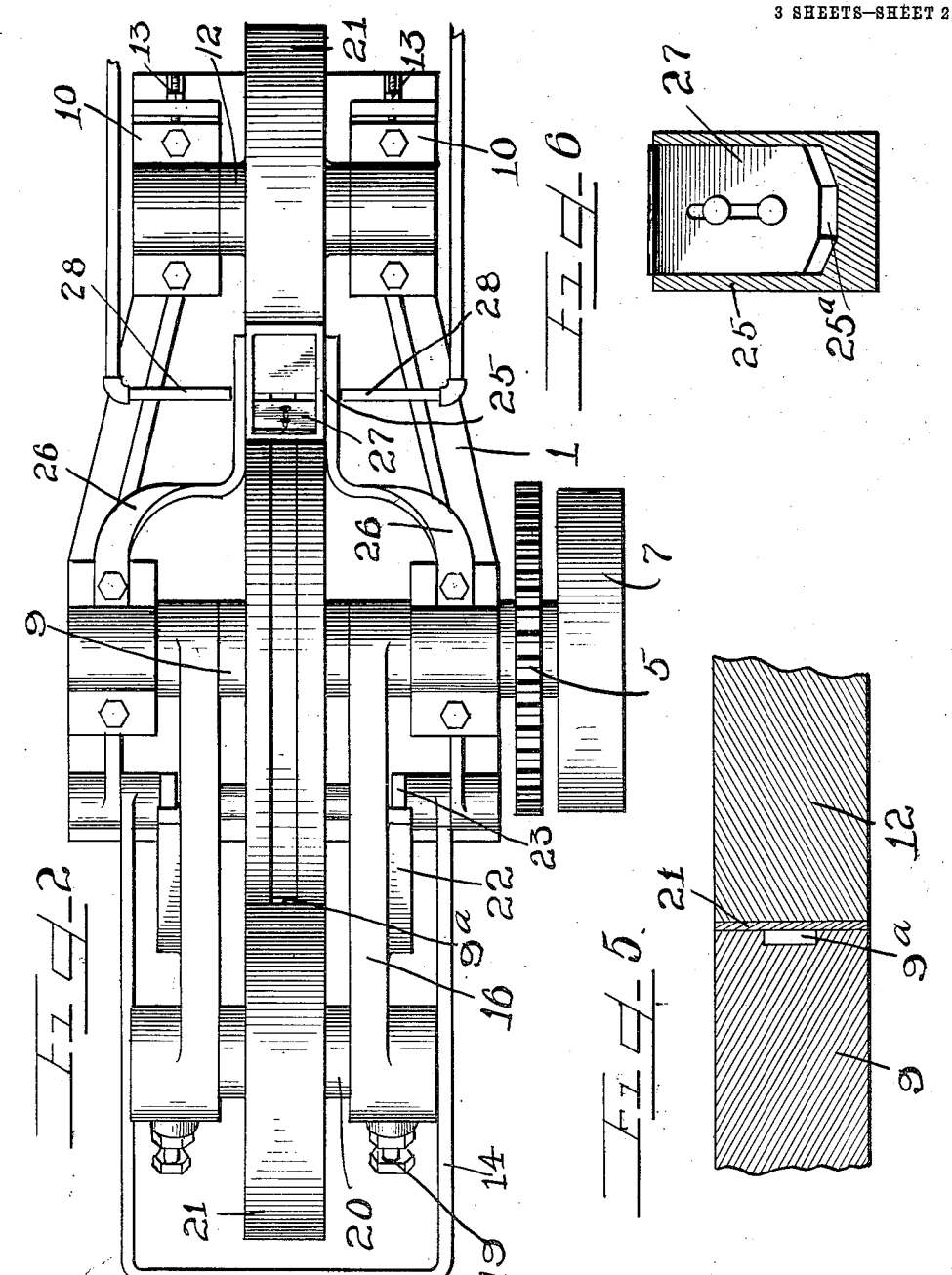

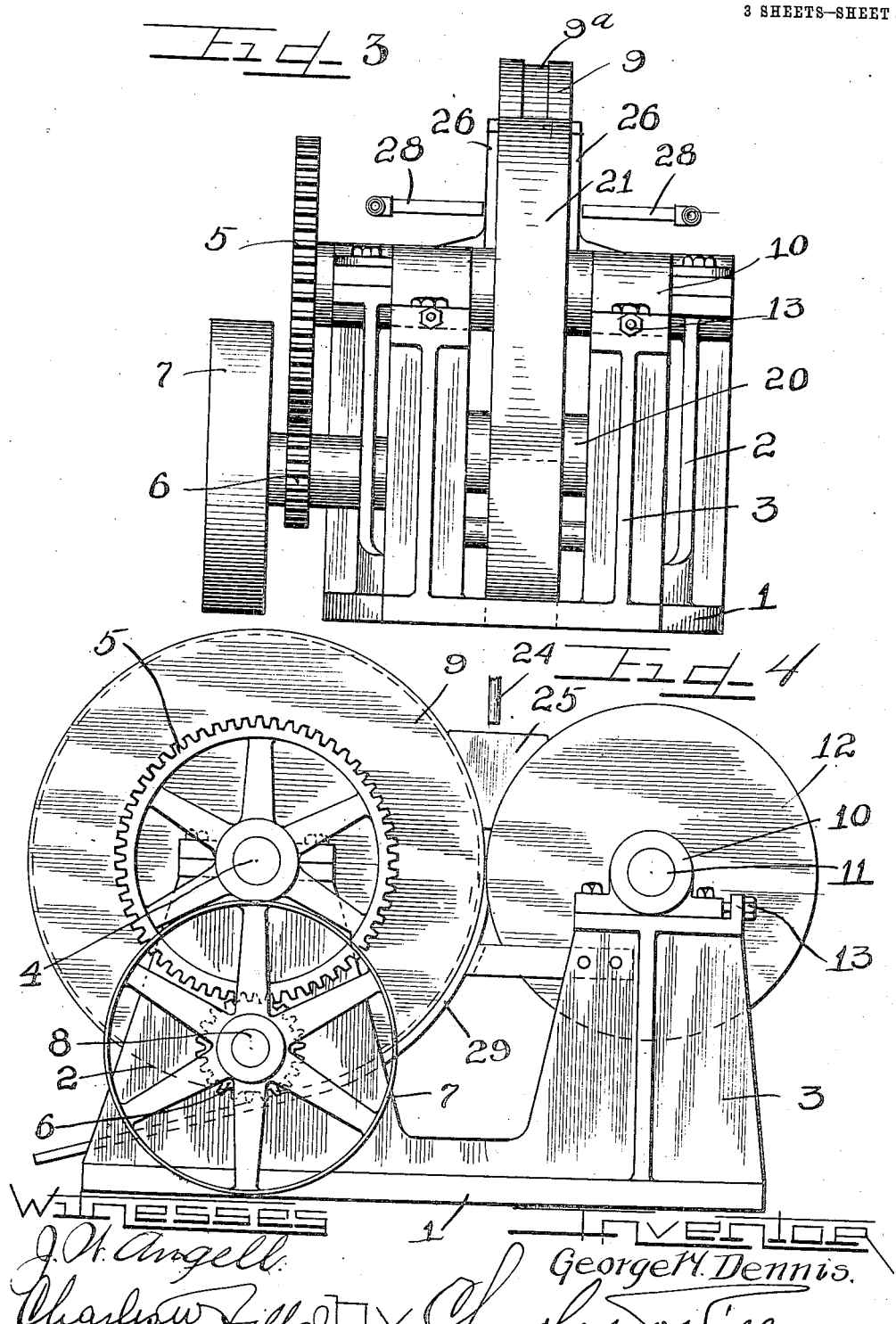

UNITED STATES PATENT OFFICE.

GEORGE W. DENNIS, OF HARVEY, ILLINOIS.

MACHINE FOR MOLDING METAL IN INDETERMINATE LENGTHS.

1,077,458. Specification of Letters Patent. Patented Nov. 4, 1913.

Application filed February 2, 1911. Serial No. 606,094.

*To all whom it may concern:*

Be it known that I, GEORGE W. DENNIS, a citizen of the United States, and a resident of the city of Harvey, in the county of Cook and State of Illinois, have invented certain new and useful Improvements in Machines for Molding Metal in Indeterminate Lengths; and I do hereby declare that the following is a full, clear, and exact description of the same, reference being had to the accompanying drawings, and to the numbers of reference marked thereon, which form a part of this specification.

Sheet lead has usually been made by a continuous rolling process. This is comparatively slow and necessarily expensive and usually necessitates passing the material through the rollers a number of times.

The object of this invention is to afford a machine for making sheet lead by what might be termed a continuous molding process and in which the sheet is fed from the mold as rapidly as formed.

It is also an object of the invention to afford a machine for making sheet lead by delivering the molten lead into a mold afforded by two coacting constantly moving members affording the walls of the mold.

It is, of course, an object of the invention to enable a sheet or strip of any desired size or width to be made and to afford mechanism in connection with such a machine whereby suitable adjustments may be made in the mechanism to compensate for variations in temperature either of the mechanism or of the molten metal, thus enabling a constant and uniform feed to be assured sufficient to keep the mold at all times filled.

The invention consists in the matters hereinafter described and more fully pointed out and defined in the appended claims.

In the drawings: Figure 1 is a view in elevation of the driving side of the machine. Fig. 2 is a top plan view thereof with the supply pipe omitted. Fig. 3 is a rear end elevation. Fig. 4 is a side elevation of a slightly modified construction. Fig. 5 is an enlarged section taken through line 5—5 of Fig. 1. Fig. 6 is an enlarged fragmentary section of the feed receptacle and the adjusting means for the discharge therefrom.

As shown in the drawings; 1, indicates the side members of the frame of the machine affording an upwardly extending standard 2, on each side thereof near the rear end and corresponding upwardly extending standards 3, at the front end of the same. Journaled in suitable bearings at the top of the standards 2, is a shaft 4, provided on the driving side of the machine at one end thereof with a gear wheel 5, which meshes with a pinion 6, as shown in Fig. 1, which is rigidly connected with the driving or belt wheel 7, secured on the driving shaft 8, which may be a non-rotative stud shaft rigidly secured on the side frame member 2, at the driving side of the machine.

Rigidly secured on the shaft 4, to revolve therewith, is the die wheel 9, of relatively large diameter and provided with a peripheral groove $9^a$ in the face thereof, as shown in Figs. 1, 2 and 3 of the width and of the depth of the sheet or strip of metal to be formed.

Slidably secured on the standards 3, at the front end of the machine, is an adjustable bearing 10, in which is journaled a shaft 11, and on which is rigidly secured a flat faced wheel or pulley 12, the width of the face of which is approximately equal to the face of the die wheel 9. As shown, adjusting screws 13, are provided in the top of the standard to bear against said bearing block 10, to adjust the same thereon toward or from the die wheel.

Pivotally engaged on the rear end of the frame is a yoke 14, provided at its outer or rear end with a counterweight 15. Journaled on the shaft 4, on each side of the die wheel are rearwardly extending arms 16, provided at their lower or rear ends with a longitudinally slotted aperture in which is journaled a shaft 17. As shown, a follower or shoe 18, bears against the outer side of the shaft and an adjusting screw or bolt 19, extends through the head of said arm and bears against said shoe to press the same toward the die wheel. Rigidly secured on said shaft is a rear belt or band wheel 20, similar to the band wheel 12, and which also is of a width of face corresponding approximately with the width of the face of the die wheel.

A steel or other metallic non-combustible belt 21, is trained about the belt wheels 12 and 20, and the upper lap thereof extends around the lower portion of the die wheel and affords the bottom of the mold for the sheet or strip as shown in Fig. 5. Secured on each of the arms 16, and integral therewith is an inclined rib or cam face 22, and a crank 23 is provided on each of the ends of the yoke 14, at the pivot therefor and bears against the under side of said rib or cam 22, and acts to hold said lever or arm upwardly to maintain tension on the belt.

A melting pot (which is not shown in the drawings) is supported at any convenient point adjacent the machine and preferably above the same, and a pipe 24, is connected therein and leads to a point above a feed trough 25, shaped to fit closely in the space between the die wheel and the belt 21, where the latter is trained over the band wheel 12, as shown in Fig. 1. Said feed receptacle or trough is supported in place by means of lateral brace bars 26, one of which is secured on each end of the trough at each side of the wheel and extends rearwardly and is secured to the standard 2. A narrow slot 25ª is provided through the rear side of said trough near the bottom thereof to direct the molten lead delivered thereinto from the pipe 24, into the groove or channel in the die wheel, and, as shown, a shutter or plate 27, is provided in the rear side of said trough and is slidably adjustable to vary or limit the discharge orifice 25ª therefrom to the die wheel.

As shown, a Bunsen burner 28, is provided at each end of the trough and connected with any suitable source of gas supply. Said burners act to maintain the temperature of the trough at the desired point to avoid the chilling of the metal when delivered thereinto and to insure the continuance of the most advantageous conditions under which the machine can work.

The operation is as follows: The lead is brought to the required or standard temperature and the receiving trough is first heated to the required temperature or to a temperature such that chilling of the metal will be avoided. The metal is then admitted into the trough from the pipe 24, any suitable valve closely connected with the pot sufficing for this purpose. The metal passes through the opening in said trough into the groove in the die wheel and is promptly cooled by contact with the die wheel and the metal belt and is simultaneously fed forwardly and through the machine and delivered in the form of a sheet ribbon or strip at the rear. Tension is at all times maintained on the belt by the counterweight attachment before described, which acts to elevate the tightener pulley or the band wheel 20. The construction is such that the machine may be driven at a high rate of speed and the metal sheet ribbon or strip rapidly formed and fed therefrom.

The construction shown in Fig. 4, is the same as that before described with the exception that in lieu of a belt affording one side of the die or mold, a fixed plate 29, extends upwardly beneath the band wheel 12, and die wheel 9, and extends rearwardly and downwardly fitting closely to said die wheel, as shown in Fig. 4, so that as the metal strip is formed and cooled, it is delivered rearwardly from the machine down said inclined plate.

Of course, details of the construction may be varied in numerous ways and the exact construction of the receiving trough and feed pipe will be varied to a greater or less extent depending upon the width or form and size of the sheet or strip to be formed. Any suitable means may be used for melting the metal, the temperature of which must be such as to render the same sufficiently fluid to readily flow in and fill the mold in the die wheel, and the rate of delivery thereinto should be sufficiently rapid as to keep the mold filled as the strip is fed rearwardly, thereby producing a smooth strip of uniform consistency. I therefore do not purpose limiting the patent to be granted on this application otherwise than necessitated by the prior art.

I claim as my invention:

1. In a machine for molding metal in long strips, a rotatable die member having a peripheral recess therein, affording a mold, a continuous band affording a closure for the mold, and a plurality of band wheels adapted to guide said band, one of said wheels being revoluble about the die member.

2. In a machine for molding metal in long strips, a pair of adjustable band wheels, a shaft, a pair of arms journaled on said shaft and supporting one of the band wheels, a rotative die member rigidly secured to said shaft, and a band trained around said band wheels and a part of the die member.

3. In a device of the class described, a frame, a rotative die member having a continuous peripheral recess therein to afford a mold, a pair of arms journaled coaxially with the rotative die member, a band wheel adjustably journaled therein, a second band wheel supported on said frame, and a band trained over said band wheels and a part of the rotatable die member, adapted to afford the closure for said mold.

4. In a machine for molding metal in long strips, a frame consisting of a horizontal base and a long and a short pair of upright members, a driving shaft journaled on the long pair of said members, a rotatable die member rigidly secured to said shaft, a shaft journaled on the short pair of uprights, a band wheel secured thereon, a pair of arms journaled on the driving shaft, a band wheel adjustably journaled in said arms adapted to be revolved about the die member, a band trained around said band wheels and die member, and means provided for admitting the molten metal into the grooves.

5. In a machine for molding metal in long strips, a frame consisting of a horizontal base and two pairs of upright members thereon, a die member rotatably mounted on one pair of said members, means for driving said member, a band wheel adjustably mounted on the other pair of said members, arms revoluble about said die member, the second band wheel adjustably mounted in said arms, and a band trained over said band wheels and under the die member.

In testimony whereof I have hereunto subscribed my name in the presence of two subscribing witnesses.

GEORGE W. DENNIS.

Witnesses:
CHARLES W. HILLS, Jr.,
ANNA B. HILLS.